3,077,458
NON-AQUEOUS FIRE RETARDANT COMPOSITION COMPRISING A UREA FORMALDEHYDE CONDENSATE

Gerrit Quelle, Amsterdam, Netherlands, and Cyril Aubrey Redfarn, London, and Raymond Thompson, East Molesey, England, assignors, by mesne assignments, to Alim Corporation, New York, N.Y., a corporation of New York
No Drawing. Filed May 26, 1958, Ser. No. 737,532
Claims priority, application Great Britain May 27, 1957
7 Claims. (Cl. 260—2.5)

It is generally acknowledged that the most successful way of imparting fire retardance to a combustible material such as wood or materials made therefrom (e.g. cardboard, hard or soft fibre insulation board and the like) is by applying a surface coating which is potentially intumescent. Such a coating swells under heat or direct flame to produce a puffed-up, non-glowing insulating cellular mat which insulates the substrate material from the heat source and at the same time excludes oxygen. The principle is also advantageous in delaying heat transfer to a treated metal surface.

Typical among such products is a composition which incorporates a foaming ingredient (e.g. mono- or di-ammonium phosphate), urea and formaldehyde in a state of condensation and an amylaceous substance such as starch. These ingredients in a finely pulverized state are mixed in optimum proportions, together with inert pigments which impart colour and/or opacity to the coating, and applied to the potentially combustible surface as an aqueous slurry or suspension. Such a composition is described in British patent specification No. 632,844.

There are two main disadvantages with the above compositions. Firstly, the curing of the coating is brought about by the chemical condensation of urea and formaldehyde, catalysed by mono-ammonium phosphate or other acid source; these three ingredients (which combination produces with heat one of the best foam mats known) cannot, therefore, be mixed for many hours before the composition is to be applied as a coating, otherwise the whole solidifies in the container. The disadvantage is overcome in practice by packaging the composition as two components which have to be intimately mixed before use, and this is frequently inconvenient. Secondly, the most effective foaming ingredients are highly water-soluble, and coatings produced from compositions containing these ingredients are water-sensitive and subject to efflorescence throughout their life. Moreover, since they are water-soluble, the slurry referred to is in fact a saturated solution, and as the water evaporates from the applied coating, undesirable crystals are grown, providing a finished surface of rough texture.

The main object of the present invention is to produce intumescent compositions which will overcome the aforesaid disadvantages and which will be adapted to produce surface coatings which may be transparent or which may have an enamel-like appearance.

An intumescent composition according to the invention is essentially non-aqueous and comprises urea and formaldehyde partially condensed in a volatile organic solvent medium, and a foaming ingredient which may be an ammonium phosphate, e.g. a mono- and/or di-ammonium phosphate, or a salt or salts, with ammonia or an amine (preferably a lower alkyl amine), of an organo partial ester of orthophosphoric acid. A particular example of a foaming ingredient of the latter type is a mixture of mono-butyl and di-butyl phosphates together with a minor amount of free orthophosphoric acid completely or partially neutralised with ammonia or a lower alkyl amine.

The use of a medium other than water has the advantage that:

(a) The composition may be formed and stored as an entity, since ionisation and condensation cannot take place sufficiently until the solvent evaporates as the applied coating dries;

(b) Water-resistant and water-insoluble film forming ingredients, which are usually insoluble in water and therefore increase the moisture resistance of the finished coating, may be incorporated in solution: and (c) The Water-soluble ingredients will not now crystallise as the solvent of the medium evaporates, and since a mixture of relatively long liquid life is produced, fillers or pigments may be intimately dispersed in the medium by mechanical milling and the combined result is that a coating of enamel-like appearance can be produced.

It is generally preferred that the non-aqueous intumescent fire retardant composition according to the invention shall comprise not only urea but also a phenol, each partially condensed with formaldehyde in an organic solvent medium. A particularly suitable organic solvent is one that is or comprises a lower aliphatic alcohol, such as methanol or ethanol. Such alcohol may be used together with an aromatic hydrocarbon such as xylene.

If the composition is required to give a surface coating of an opaque or enamel-like character there is incorporated therein a substantial amount of a water-insoluble filler or pigment which may be for example rutile, anatase, asbestine, mica, vermiculite and/or antimony oxide. In this case it is particularly desirable that the composition should include phenol as well as urea condensed with formaldehyde.

In the case that the composition is required to produce a transparent surface coating, the foaming ingredient should be a salt or salts, with ammonia or an amine, of an organic partial ester of orthophosphoric acid, because ammonium phosphates such as mono- or di-ammonium phosphates are liable to become opaque when the organic solvent medium evaporates from an applied coating.

In some cases, instead of incorporating a straight urea-formaldehyde condensation product in the composition, there may be employed an alkylated, e.g. butylated, urea-formaldehyde resin. This may be particularly useful when preparing compositions for producing transparent surface coatings, and it is then desirable that the foaming ingredient should be an organophosphoric acid ester as hereinbefore mentioned.

A plasticizer is usefully incorporated in the composition, particularly in the case of a composition for producing transparent surface coatings, and particularly useful plasticizers are glyceryl-a-tolyl ether and glyceryl di-tolyl ether.

As hereinbefore indicated, the compositions of the invention may incorporate, as a further addition, a water-resistant and water-insoluble film-forming resin.

The following indicates how typical compositions according to the invention may be produced:

Urea and formaldehyde (or a substance such as hexamethylene tetramine which liberates formaldehyde), together with a phenol or a substituted phenol, are mixed together and stirred into an appropriate proportion (indicated by examples hereinafter) of a non-aqueous solvent, more particularly a lower aliphatic alcohol. A certain degree of condensation is then allowed or caused to take place by keeping the mixture for a time at a predetermined temperature, or during a sequence of time/temperature conditions. This will be made clear by stating that if methanol is used as a solvent a suitable heating sequence is a period of gentle refluxing at 65 to 70° C. for about 1½ hours, whereafter the ethanol or substituted phenol is added, and which is then followed by refluxing for a period of between ½ to 4 hours. It is not possible to assess the precise degree of resin condensation which results from this procedure but it may be said that the optimum is when the condensation product has a viscosity, at room temperature, in the range of 20-30 seconds No. 4 Ford cup. The product, which constitutes the resin or binder constituent of the composition, is then cooled and thereafter the finely pulverised foaming ingredient and filler or pigment (if required) are stirred in. The mixture may then be raised again to a temperature of, say, 60° C. for a ½ hour to effect further condensation. Final mixing and dispersion may be effected by mechanical means such as are typically used in the paint industry.

The following are examples of formulations for the production of non-aqueous intumescent fire retardant compositions according to the invention in accordance with the procedure indicated generally above.

*Example I*

| | Percent by weight |
|---|---|
| Urea | 11.4 |
| Formaldehyde | 15.9 |
| Phenol | 4.1 |
| Methanol | 28.1 |
| Mono-ammonium phosphate | 27.0 |
| Anatase | 2.7 |
| Asbestine | 10.8 |
| | 100.0 |

*Example II*

As Example I but with resorcinol or para-chloro-meta-xylenol instead of phenol.

*Example III*

As Examples I or II but with some or all of the anatase replaced by antimony oxide. Not only is the antimony oxide merely an alternative "filler" to the anatase, but under fire conditions it is reactive with chlorine-containing compounds if such are present in the composition and forms antimonyl chloride, which is well known as a flame-extinguishing gas.

*Example IV*

As any of the above examples but with some of the inert filler replaced by a material such as mica or vermiculite which will exfoliate under fire conditions to give added film thickness. These materials are also more refractory than the carbonaceous/phosphate foam mat, and hence give increased resistance to fire.

*Example V*

As any of the above examples but with a silicone (e.g. an organo polysiloxane) incorporated to increase water repellency.

*Example VI*

As any of the above examples but with a water-resistant resin or other compound incorporated (e.g. a cyclic ketonic resin or urea formaldehyde-toluene sulphonamide complex). Additions of the order of up to 10% of these ingredients on the composition given in Example I impart useful properties, especially with reference to resistance to moisture.

There are many occasions when a transparent rather than an opaque lacquer is required; e.g. when a wooden or veneered surface is to be flame-proofed but at the same time it is desired to retain the attractive appearance of the natural grain. Such a lacquer cannot be obtained merely by the elimination of the opaque pigments (e.g. anatase, asbestine, mica) from the compositions given in Examples I to VI; the foaming ingredient (e.g. ammonium phosphate) also becomes opaque when the organic solvent medium evaporates from an applied coating. However, by replacement of the monoammonium phosphate by a mono- or di-substituted organo partial ester of orthophosphoric acid, a coating which dries and remains transparent is obtained.

*Example VII*

The resin or binder is prepared in the manner described hereinbefore, and mixed with the other ingredients to form a composition typified by:

| | Parts by weight |
|---|---|
| Urea | 11.4 |
| Paraformaldehyde | 15.9 |
| Phenol | 4.1 |
| Ethanol | 36.1 |
| Monobutyl phosphoric acid | 12.5 |
| Dibutyl phosphoric acid | 5.3 |
| Ammonia (anhydrous) | 2.2 |
| Para-chloro-meta-xylenol | 15.0 |
| Glyceryl a-tolyl ether | 7.5 |
| | 100.0 |

Glyceryl a-tolyl ether acts as a plasticizer in the above composition, and serves to increase resistance to crazing ("cold-checking"). As an alternative to glyceryl a-tolyl ether, this material may be replaced by an equal weight of glyceryl di-tolyl ether. Para-chloro-meta-xylenol also serves to increase resistance to crazing, but more particularly to increase moisture resistance.

As an alternative to the use of the particular resins prepared as described hereinbefore, the materials which impart fire retardance and those which plasticize the resin may be mixed advantageously with a butylated urea-formaldehyde resin syrup of the type commercially available. The proportion of resin syrup to other materials (excluding solvents) necessary to produce a coating with good drying properties consistent with an adequate storage life has been found to be much higher than in Example VII, and a typical composition is as follows:

*Example VIII*

| | Parts by weight |
|---|---|
| Butylated urea formaldehyde syrup, 55% solids in butanol/xylol | 75 |
| Monobutyl phosphoric acid | 7.25 |
| Dibutyl phosphoric acid | 3.10 |
| Monomethylamine | 1.50 |
| Ethanol | 5.65 |
| Para-chloro-meta-xylenol | 5.00 |
| Glyceryl a-tolyl ether | 2.50 |
| | 100.00 |

Additional resistance to "cold-checking" may be imparted by the addition of up to 10% of tris β-chloroethyl phosphate, weight by weight, to the mixture of Example VIII.

What we claim is:

1. A substantially non-aqueous intumescent fire-retardant composition comprising a condensation product and a foaming ingredient in admixture in a 1 to 2 carbon atom alkanol as solvent, said condensation product being a 1 to 2 carbon alkanol soluble urea-formaldehyde condensation product and said foaming ingredient being selected from the group consisting of ammonium and lower alkyl-amine salts of from mono to dibutyl esters of o-phosphoric acid.

2. A composition according to claim 1 in which the foaming ingredient is formed by reacting ammonia with monobutyl phosphoric acid.

3. A composition according to claim 2 in which the foaming ingredient is formed by reacting monomethylamine with dibutyl phosphoric acid.

4. A composition according to claim 1 in which the composition is produced from the following components:

| | Parts by weight |
|---|---|
| Butylated urea formaldehyde syrup, 55% solids in butanol/xylol | 75 |
| Monobutyl phosphoric acid | 7.25 |
| Dibutyl phosphoric acid | 3.10 |
| Monomethylamine | 1.50 |
| Ethanol | 5.65 |
| Para-chloro-meta-xylenol | 5.00 |
| Glyceryl a-tolyl ether | 2.50 |

5. A composition according to claim 1 in which the resin is a urea, phenol and formaldehyde condensation product having a viscosity, at room temperature, in the range of 20–30 seconds No. 4 Ford cup.

6. A composition according to claim 5 in which the phenol is para-chloro-meta-xylenol.

7. A composition according to claim 5 in which the composition is produced from the following components:

| | Parts by weight |
|---|---|
| Urea | 11.4 |
| Paraformaldehyde | 15.9 |
| Phenol | 4.1 |
| Ethanol | 36.1 |
| Monobutyl phosphoric acid | 5.3 |
| Ammonia (anhydrous) | 2.2 |
| Para-chloro-meta-xylenol | 15.0 |
| Glyceryl a-tolyl ether | 7.5 |

References Cited in the file of this patent

UNITED STATES PATENTS

| 2,650,206 | Stock | Aug. 25, 1953 |
| 2,676,162 | Marotta | Apr. 20, 1954 |

FOREIGN PATENTS

| 785,977 | Great Britain | Nov. 6, 1957 |

OTHER REFERENCES

Ellis: "Chemistry of Synthetic Resins," volume 1, pages 672–678, copyright 1935, Reinhold Pub. Corp., New York.